United States Patent [19]

Ross, Jr. et al.

[11] Patent Number: 5,259,855
[45] Date of Patent: Nov. 9, 1993

[54] APPARATUS FOR SEPARATING FLUIDIZED CRACKING CATALYSTS FROM HYDROCARBON VAPOR

[75] Inventors: Joseph L. Ross, Jr., Dallas; Charles Schaub, Katy; Carl J. Horecky, Friendswood, all of Tex.

[73] Assignee: Stone & Webster Engineering Corp., Boston, Mass.

[21] Appl. No.: 41,680

[22] Filed: Apr. 1, 1993

Related U.S. Application Data

[63] Continuation of Ser. No. 756,479, Sep. 9, 1991.

[51] Int. Cl.$^5$ .............................................. B11D 45/12
[52] U.S. Cl. ........................................ 55/349; 55/459.1; 208/153; 208/161; 422/147
[58] Field of Search .............. 55/342, 346, 349, 459.1; 208/153, 161; 422/147

[56] References Cited

U.S. PATENT DOCUMENTS

| | | | |
|---|---|---|---|
| 2,439,811 | 4/1948 | Jewell | 196/52 |
| 2,878,891 | 3/1959 | Ross et al. | 183/34 |
| 2,888,096 | 5/1959 | Evans | 183/80 |
| 2,901,420 | 8/1959 | Evans | 208/153 |
| 2,947,577 | 8/1960 | Van Dommelen | 302/59 |
| 3,074,878 | 1/1963 | Pappas | 208/127 |
| 3,215,505 | 11/1965 | Schmalfeld et al. | 23/284 |
| 3,243,265 | 3/1966 | Annesser | 23/288 |
| 3,247,651 | 4/1966 | Hutchings | 55/345 |
| 3,443,368 | 5/1969 | Wilson et al. | 55/435 |
| 3,607,127 | 9/1971 | Pfeiffer | 23/288 |
| 3,619,415 | 11/1971 | Jones et al. | 208/164 |
| 3,841,843 | 10/1974 | Williams et al. | 23/288 |
| 3,957,443 | 5/1976 | Strickland et al. | 23/288 |
| 3,959,117 | 5/1976 | Bunn, Jr. et al. | 208/113 |
| 4,061,562 | 12/1977 | McKinney et al. | 208/61 |
| 4,219,407 | 8/1980 | Haddad et al. | 208/151 |
| 4,288,235 | 9/1981 | Gartside et al. | 55/196 |
| 4,313,910 | 2/1982 | Dries et al. | 422/147 |
| 4,348,364 | 9/1982 | Gartside et al. | 422/214 |
| 4,356,082 | 10/1982 | Gross | 208/164 |
| 4,364,905 | 12/1982 | Farhig et al. | 422/144 |
| 4,433,984 | 2/1984 | Gartside et al. | 55/196 |
| 4,664,888 | 5/1987 | Castagnos, Jr. | 422/147 |
| 4,664,889 | 5/1987 | Steenge et al. | 422/147 |
| 4,666,674 | 5/1987 | Barnes | 422/144 |
| 4,666,675 | 5/1987 | Parker et al. | 422/147 |
| 4,692,235 | 9/1987 | Parker et al. | 208/113 |
| 4,693,808 | 9/1987 | Dewitz | 208/113 |
| 4,725,408 | 2/1988 | Pratt et al. | 422/144 |
| 4,731,228 | 3/1988 | Dewitz | 422/144 |
| 4,756,886 | 7/1988 | Pfeiffer et al. | 422/144 |
| 4,778,660 | 10/1988 | Haddad et al. | 422/144 |
| 4,797,262 | 1/1989 | Dewitz | 422/142 |
| 4,810,360 | 3/1989 | Haddad et al. | 208/152 |
| 4,853,107 | 8/1989 | Haddad et al. | 208/152 |
| 4,875,993 | 10/1989 | Mauleon et al. | 208/113 |
| 4,891,129 | 1/1990 | Barnes | 208/161 |
| 4,895,636 | 1/1990 | Chen et al. | 208/113 |
| 4,927,527 | 5/1990 | Haddad et al. | 208/161 |
| 4,961,863 | 10/1990 | Van Den Akker et al. | 210/788 |
| 4,971,681 | 11/1990 | Harandi et al. | 208/113 |

FOREIGN PATENT DOCUMENTS 110117 2/1956 France .
671221 4/1952 United Kingdom .

*Primary Examiner*—Charles Hart
*Attorney, Agent, or Firm*—Hedman, Gibson & Costigan

[57] ABSTRACT

The invention is a process and apparatus for rapidly and efficiently separating a fluidized catalytic cracking mixture into cracking catalysts and hydrocarbon vapor. The invention decreases the production of unwanted hydrocarbon byproducts by decreasing the contact time between the separated hydrocarbon vapor and the cracking catalyst.

16 Claims, 5 Drawing Sheets

APPARATUS FOR SEPARATING FLUIDIZED CRACKING CATALYSTS FROM HYDROCARBON VAPOR

This is a continuation of Ser. No. 756,479, filed Sep. 9, 1991.

FIELD OF THE INVENTION

The present invention relates to a process for separating fluidized cracking catalysts from cracked hydrocarbon vapors. The invention also provides an apparatus for quickly and efficiently separating fluidized cracking catalysts from cracked hydrocarbon vapors at the terminal end of a catalytic cracking riser reactor.

BACKGROUND OF THE INVENTION

Originally hydrocarbon cracking was accomplished pyrolytically by using Dubbs thermal cracking units similar to visbreakers. When naturally occurring acidic silica-alumina clays were found to be effective cracking catalysts, fluidbed processing was adopted to improve cracking selectivity for less gas and more gasoline and distillate production relative to thermal cracking. These fluid bed crackers exhibited long residence time cracking in the range of 10-30 seconds with substantial product backmixing in the fluid bed reactor. Because there was no means of disengaging the catalyst from the hydrocarbon vapors, the entire reactor vessel served as reaction volume, not just the dense fluid bed. The hydrocarbon product and cracking catalyst were entrained together to the reactor cyclones thereby substantially increasing the overall cracking residence time.

When new high active zeolite catalyst were developed, the residence time had to be drastically reduced to avoid overcracking by the very active catalyst. Bed crackers were converted to riser transport reactors with a small bed at the end of the riser. As catalysts improved, the dense bed component of the reactor was eliminated resulting in all riser cracking with a residence time of about 1-5 seconds. Riser cracking resulted in much more selective cracking products (less gas, more gasoline) due to a reduction in backmixing and product degradation via overcracking in the riser.

Along with the new catalysts and new cracking schemes to accommodate these catalysts, a need was created to rapidly separate the highly reactive cracking catalysts from the cracked hydrocarbon vapor to preserve the selection riser cracking products and avoid further reactions to undesirable byproducts after exiting the reactor riser. In addition to rapidly separating the cracking catalysts and cracked hydrocarbon product, a means to collect and recycle the cracking catalysts was needed to insure the most efficient use of the overall catalytic cracking scheme. With the more highly active catalysts, there was more concern over post riser cracking in the dilute phase (catalyst entrained in the gas leaving the riser and proceeding to the reactor vessel cyclones). Initially only catalytic aftercracking was contemplated. Various means were developed for separating the catalyst particles from the cracked product gas. The most common and now traditional means for separating the catalyst and product gases from a riser reactor are the cyclone separators. Other catalyst riser reactor separation methods exist which rely on either inertial forces or centrifugal forces.

For example, apparatus has been developed to roughly separate cracking catalysts and vapor products by using a pipe tee arrangement to change the direction of the catalyst-gas mixture issuing from the riser reactor by 180° and thereby obtain rough separation based on inertial forces.

Other variations of inertial separation use a horizontal deflection plate at the end of the riser reactor instead of a pipe tee to change the direction of the feed mixture by 180° and thereby achieve separation. Illustrative methods and apparatus are taught by Van Dommelen, U.S. Pat. No. 2,947,577, Strickland et al., U.S. Pat. No. 3,957,443, and Pfeiffer et al., U.S. Pat. No. 4,756,886.

Hutchings, U.S. Pat. No. 3,247,651 describes an inertial type separator that comprises an elbow at the end of the riser reactor to change the direction of the feed mixture by 90° instead of 180°. This change in direction results in a poor separation with approximately 60% of the cracking catalyst falling back into the riser reactor.

Effectively, the inertia type separators allow the vapor product to remain in contact with a portion of the cracking catalyst after separation thereby resulting in unwanted side reactions and byproducts.

Prior art separators such as Jewell, U.S. Pat. No. 2,439,811 teach a separation technique, based on centrifugal force rather than inertia type separation. In essence, the centrifugal separators use a semicircular deflection means at the top of a riser reactor to change the direction of the feed mixture by 180° and to impart a centrifugal force on the feed mixture causing separation of the vapor product and cracking catalyst. The separated catalyst is then deposited in the bottom of the separator vessel and the vapor product is drawn from the separation vessel.

A different type of centrifugal separator is taught by Ross et al., U.S. Pat. No. 2,878,891 and McKinney et al., U.S. Pat. No. 4,061,502. These separators employ a curved riser reactor pipe to create the centrifugal force. The curved riser reactor causes the cracking catalysts to travel against the outside wall of the separator while the vapor product remains closer to the inside wall where it can be removed.

Another type of centrifugal separator is taught by Evans, U.S. Pat. Nos. 2,901,420 and 2,888,096. The separators disclosed therein are essentially horizontal centrifugal separators or horizontal cyclone separators where the feed mixture is tangentially fed into the horizontally mounted cylinder. The mixture travels around the walls of the cylinder where centrifugal forces act upon it causing the cracking catalysts and vapors to separate. The vapors are removed axially through the centrally disposed pipe in the cyclone cylinder, while the cracking catalysts are removed through an opening in the bottom of the cylinder.

Although the centrifugal separators which have been in use for some time achieve efficient separation; at times in the area of 90-99% efficiency, separation is not rapid. Therefore the vapor product remains in contact with a significant portion of the cracking catalysts during the separation process thereby producing unwanted side reactions and byproducts.

Also the collection efficiencies of these separators degrade significantly when process conditions vary or upsets occur.

In addition to the vapor product remaining in contact with the catalyst during separation causing unwanted side reactions and byproducts, further side reactions occur and byproducts result by thermal cracking of the separated vapor product due to uncontrolled post riser reactor residence time. Post riser reactor residence time is defined as the time the cracked hydrocarbon product remains in the separator, after exiting the riser reactor. The normal cracking temperature of 950°-980° F. causes a significant amount of thermal cracking to occur if the post riser reactor residence time is not controlled. This post riser reactor thermal cracking is becoming even more of a problem with the increased demand for high octane gasolines and olefins for alkylation which are produced by a higher than normal riser reactor temperature.

SUMMARY OF THE INVENTION

To this end, an object of the present invention is to provide a process to minimize the post riser reactor catalytic cracking of the hydrocarbon vapor product.

A further object of this invention is to provide a process to minimize the post riser reactor thermal cracking of the hydrocarbon vapor product.

Another object of the present invention is to provide an apparatus to minimize the post riser reactor thermal cracking of the hydrocarbon vapor product.

Still another object of the present invention is to provide an apparatus to minimize the post riser reactor thermal cracking of the hydrocarbon vapor product.

Applicants have found that by employing an inertial type separator at the terminal end of the riser reactor in combination with a horizontally disposed gas outlet with a horizontally disposed gas opening facing upwardly and toward the riser reactor or upwardly and away from the riser reactor affords a quick and efficient separation of the hydrocarbon vapor product from the catalysts and reduces the post riser reactor residence time of the vapor product minimizing the post reactor thermal cracking.

DETAILED DESCRIPTION OF THE INVENTION

Figure 1:
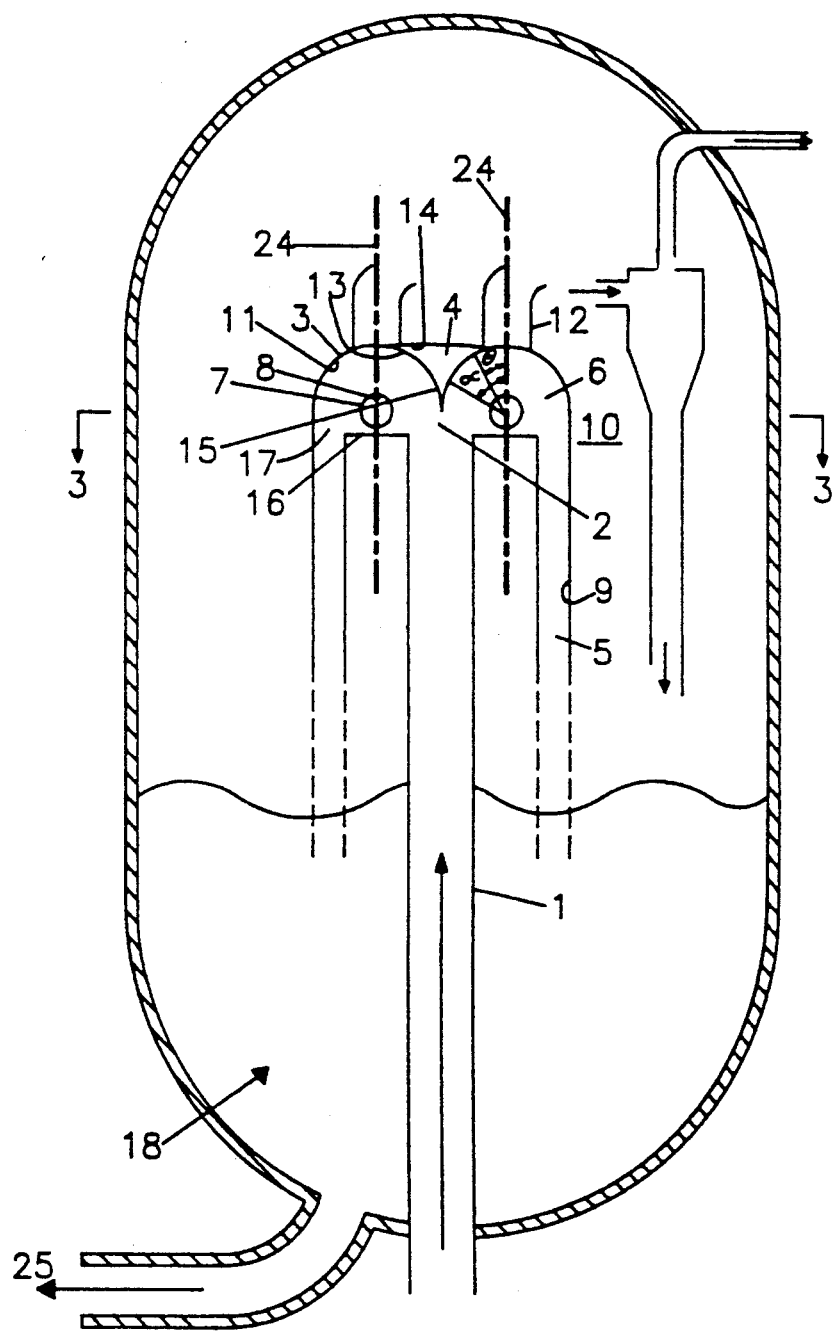
FIG. 1 is a sectional elevational view of the separator apparatus of the present invention shown in a riser reactor vessel.
Figure 2:
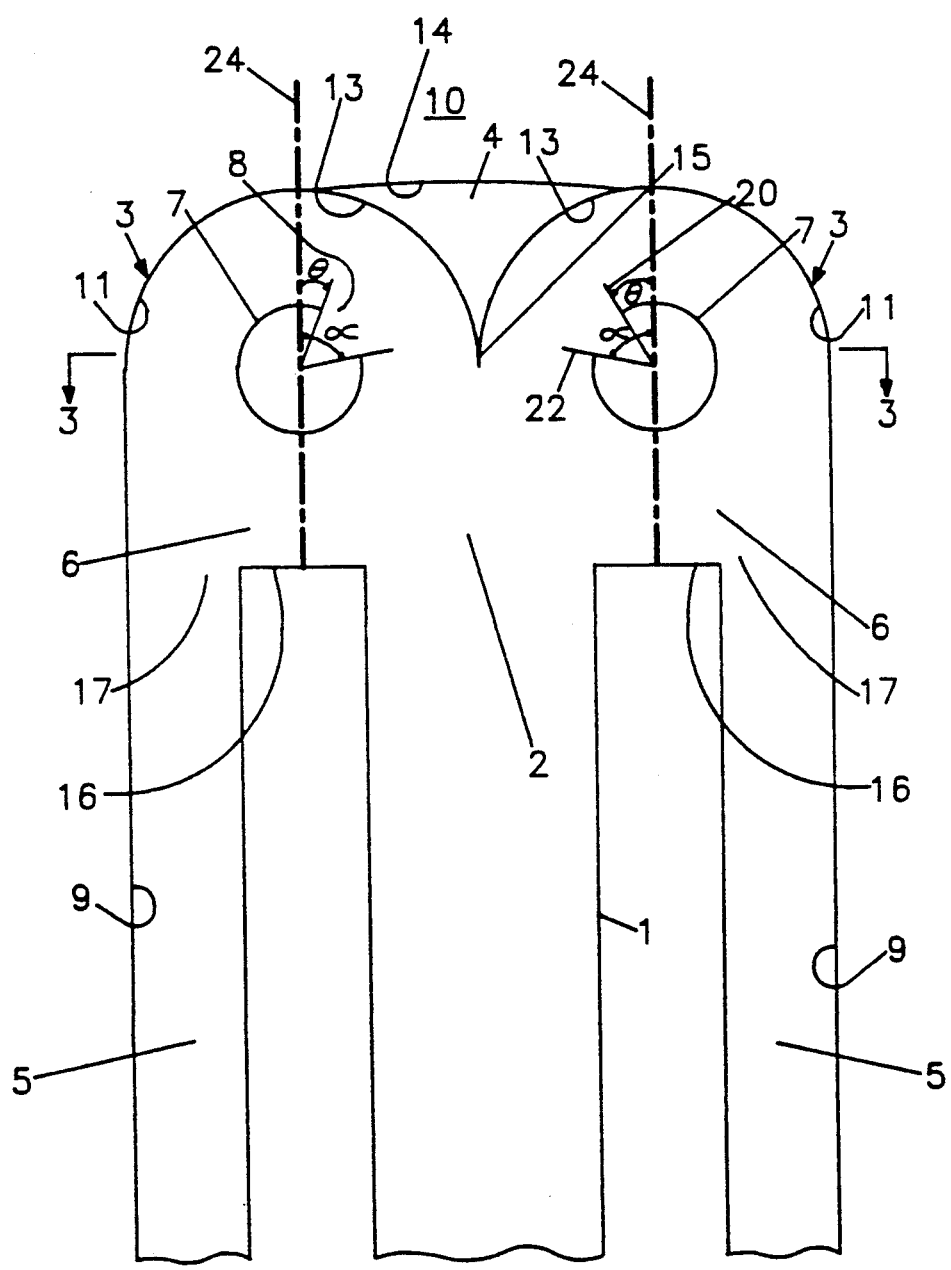
FIG. 2 is a cross-sectional view of the separation apparatus of the present invention.

FIGS. 1 and 2 show a cross-sectional view of the preferred embodiment of the separator 10 of the claimed invention. In the preferred embodiment, the separator 10 is located at the terminal end of a catalytic cracking riser reactor 1. The separator 10 is comprised of a separator housing 3, deflection means 4, two parallel gas outlets 7, two downwardly flowing solids outlets 5 and a centrally located cracked gas-solids inlet 2.

The centrally located cracked gas-solids inlet 2 is located in the base 16 of the separator 10, directly above the terminal end of the catalytic cracking riser reactor 1.

The deflection means 4 is wedge-shaped with the side walls 13 having a concave shape. The base 14 of the deflection means 4 is attached to the inner surface 11 of the separator housing 3. The point 15 of the deflection means 4 is located directly above the center of the centrally located cracked gas-solids inlet 2.

The deflection means 4 divides the separator 10 into two distinct semi-circular separating areas 6. The semi-circular separating areas 6, are defined by the concave side walls 13 of deflection means 4 and the concave walls 11 of the separator housing 3.

Each semi-circular separating area 6, contains a gas outlet 7. Each gas outlet 7 is horizontally disposed and runs parallel to the base 16 of the separator 10 and parallel to the inner concave surface 11 of the separator housing 3. Each gas outlet 7 also contains a horizontally disposed gas opening 8 which can be located at any position around the gas outlet 7. In a preferred embodiment, the horizontally disposed gas opening 8 extends the length of the gas outlet 7, and is positioned to face inwardly, with respect of the riser reactor 1, toward the deflection means 4. The lower edge 22 of the gas opening 8 is at an angle o to the vertical center line 24 of the gas outlet tube 7 and the upper edge 20 is at an angle $\theta$ to the vertical center line 24. The angle $\alpha$ can range from 30° to 135° with the preferred range being 30° to 90° and the angle $\theta$ can range from $-30°$ to 75° with the preferred range being 0° to 30°.

In a particular embodiment of the separator, the gas opening 8 is oriented toward the riser reactor 1 and directed upward. The angle $\alpha$ is about 90° to the vertical center line 24 and the angle $\theta$ is about 30° to the vertical center line 24.

Figure 5:
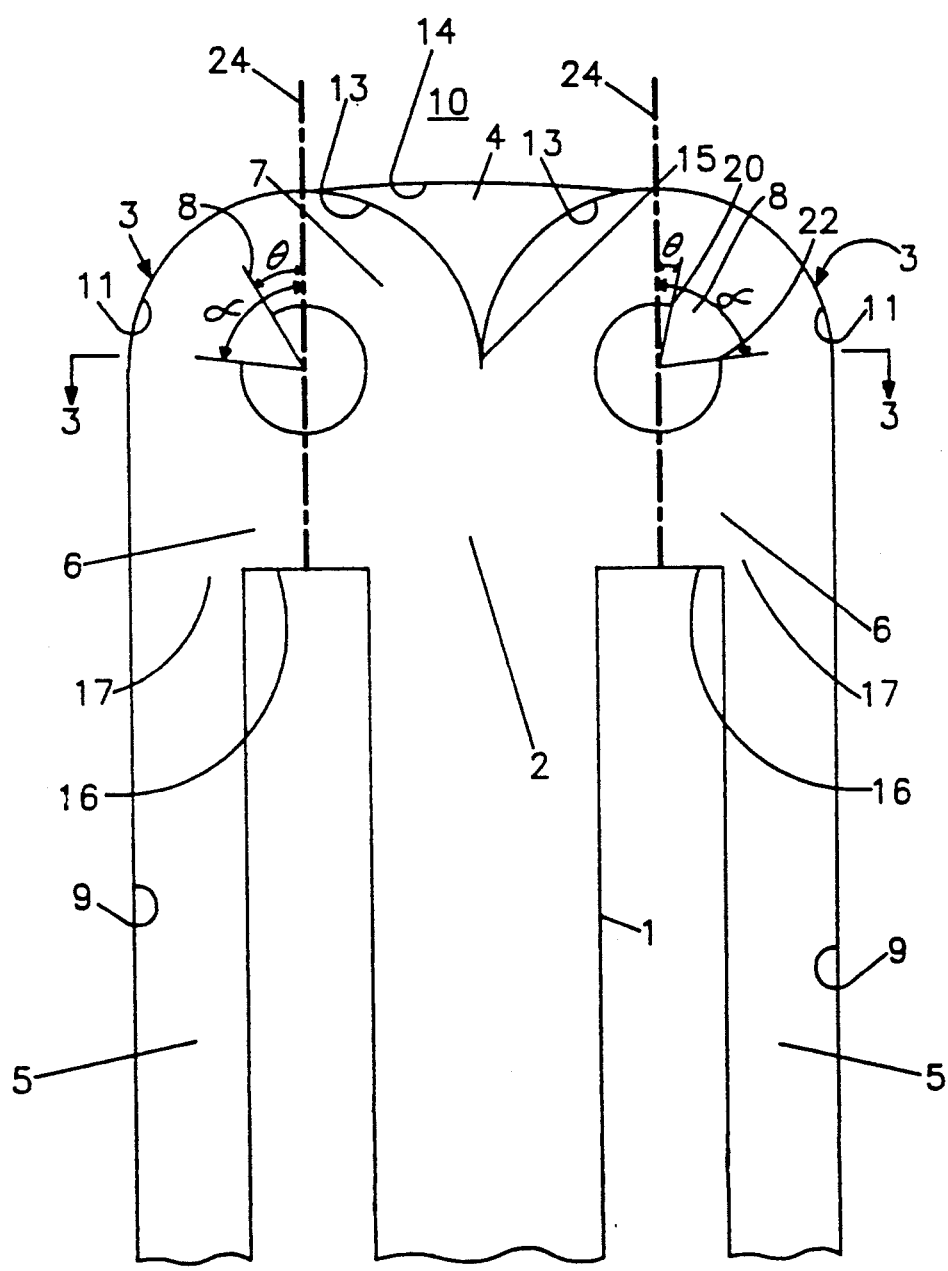
FIG. 5 is a cross-sectional view of another embodiment of the separation apparatus of the present invention.

In another version of the preferred embodiment, the horizontally disposed gas opening 8 extends the length of the gas outlet 7 and is positioned to face outwardly, with respect to the riser reactor 1, toward the concave surface 11 of the separator 10 as seen in FIG. 5. The lower edge 22 of the gas opening 8 is at an angle $\alpha$ to the vertical center line 24 of the gas outlet tube 7 and the upper edge 20 is at an angle $\theta$ to the vertical center line 24. The angle $\alpha$ can range from 30° to 135° with the preferred range being 30° to 90° and the angle $\theta$ can range from $-30°$ to 75° with the preferred range being 0° to 30°.

In another particular embodiment of the separator, the gas opening 8 is oriented away from the riser reactor 1 and directed upward. The angle $\alpha$ is about 90° to the vertical center line 24 and the angle $\theta$ is about 30° to the vertical center line 24.

Figure 4:
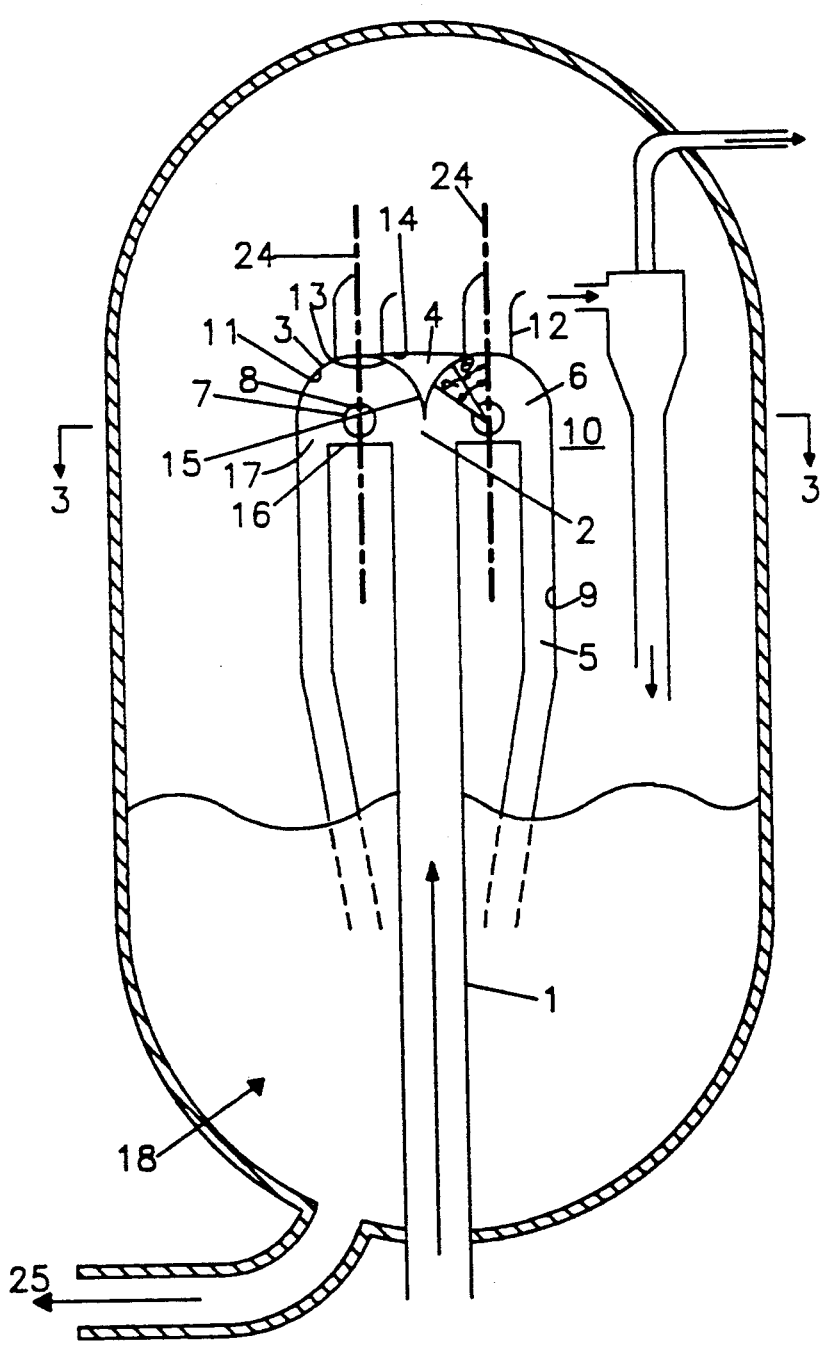
FIG. 4 is a sectional elevational view of another embodiment of the separator apparatus of the present invention shown in a riser reactor vessel.

Each semi-circular separating area 6 also contains a downwardly flowing solids outlet 5. The downwardly flowing solids outlets 5 are parallel to each other and parallel to the catalytic cracking riser reactor 1 at the elevation of the separator inlet 2. In one embodiment, the downwardly flowing solids outlets 5 remain parallel to each other and terminate above or in catalyst/solids bed 18 as shown in FIG. 1. In another embodiment, the downwardly flowing solids outlets 5 angle before termination above or in the catalyst/solid bed 18 as seen in FIG. 4. The outer walls 9 of each downwardly flowing solids outlet 5 are continuous with the inner concave wall 11 of the separator housing 3.

Openings 17 located in the base 16 of the separator 10 connect the downwardly flowing solids outlets 5 with the semi-circular separating areas 6.

Figure 3:
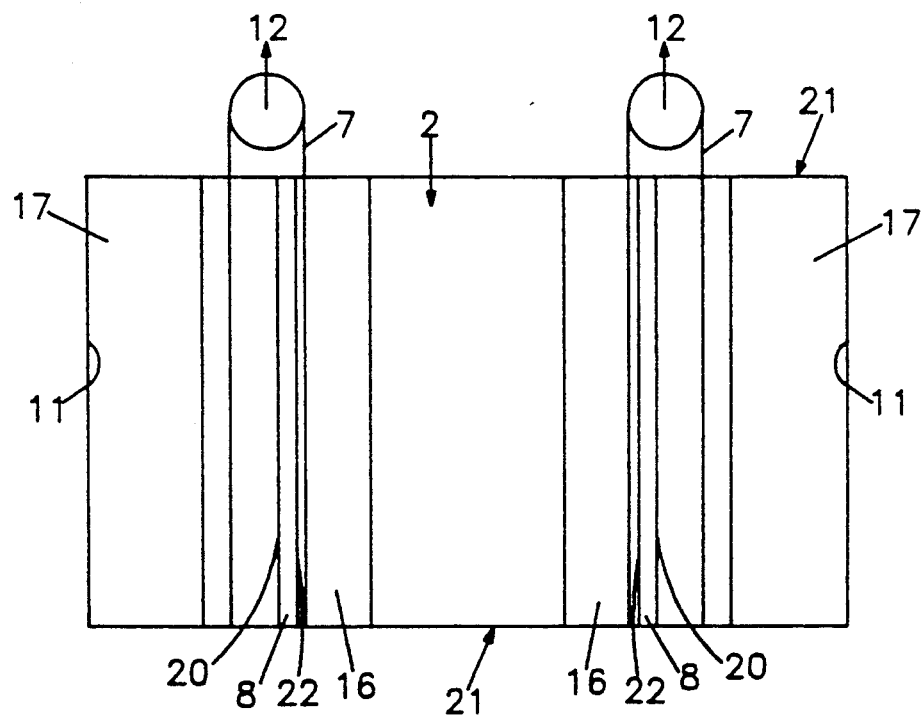
FIG. 3 is a sectional plan view of the separation apparatus of FIGS. 1 and 2 taken along line 3—3 of FIG. 2.

FIG. 3 is a sectional plan view of the separation apparatus of FIGS. 1 and 2 taken along line 3—3 of FIG. 2. Depicted is the centrally located cracked gas-solids inlet means 2 in the base 16 of the separator 10 and the opening 17 which connects the separator 10 to the downwardly flowing solids outlets 5. The gas outlets 7 with horizontally disposed gas opening 8 are also shown along with the terminal walls 21 of the separator 10 and a portion of the inner concave surface 11 of the separator housing 3.

The improved process for rapidly separating cracking catalyst solids from hydrocarbon vapor product and for reducing thermal cracking in the post riser reactor employs the above described apparatus. The process proceeds by feeding a mixture of cracking catalyst and hydrocarbon vapor product into the separator 10 wherein the mixture is deflected into one of two separating areas 6, causing the solids to separate from the vapor products. The vapor products are collected and removed from the separator 10 by the gas outlets 7.

Referring to FIGS. 1 and 2, the gas-solids mixture which generally has a concentration of 1–2 lbs. of solids per cubic foot of gas and a temperature of 975°±50° F. leaves the terminal end of the catalytic cracking riser reactor 1 and enters the separator 10 by way of the centrally located cracked gas-solids inlet means 2. The velocity of the mixture as it leaves the riser reactor 1 and enters the separator 10 is between 30 to 80 feet per second.

Upon entering the separator 10, the gas-solids mixture encounters the deflection means 4, which deflects the gas-solids mixture into either of the two semi-circular separating areas 6. The deflected gas-solids mixture then travels along the concave walls 13 of deflection means 4 and continues along the inner concave surface 11 of the separator housing 3. The concave walls 13, of the deflection means 4 and inner concave surface 11 of the separator housing 3 form the semi-circular walls of the semi-circular separating areas 6.

As the deflected gas-solids mixture travels along the walls of the semi-circular separating areas 6, centrifugal force acts upon the deflected gas-solids mixture causing it to separate into cracking catalyst solids and hydrocarbon vapor product.

The cracking catalyst continues its semi-circular path in the semi-circular separating area 6 until it reaches the downwardly flowing solids outlet 5. The cracking particulate catalyst solids exit the separator 10 through the openings 17 and enter the downwardly flowing solids outlets 5 which guide the cracking catalysts to a collection section then through line 25 to recycling or regeneration, as seen in FIG. 1.

The separated vapor product is removed from the semi-circular separating area 6 through the horizontally disposed gas opening 8 in the gas outlet 7. In the preferred embodiment, the horizontally disposed gas opening 8 is located opposite the concave walls 13 of deflection means 4 for rapidly removing the separated vapor product from contact with the separated cracking catalysts which reduces the post riser reactor residence time thereby reducing further thermal cracking.

The vapor product is then sent through the process gas line 12, as seen in FIG. 3, for further processing such as a cyclone separator seen in FIG. 1 and/or a quench step, depending on the particular working parameters of the cracking process.

The separation of catalysts and vapor product by this apparatus and process is 95–99% efficient with the total residence time in the separator ranging from 0.1 to 0.2 seconds.

The invention will be further defined by means of the following prophetic examples, which employed a 1:10 scale model of a preferred embodiment of the present invention. The dimensions of the separator are as follows:

4 inch diameter gas-solid inlet 2;
4 inch diameter riser reactor 1;
3 inch diameter downwardly flowing solids outlet 5;
3¼ inch radius of semicircular separating area 6;
3 inch diameter gas outlet tube 7;
8 inches from the center of the gas-solid inlet 2 to the outermost wall of the downwardly flowing solids outlet 5;
1 9/16 inch horizontal opening 8 on the gas outlet tube 7;
3¾ inch high deflecting means 4;
4½ inches from the center of the deflecting means 4 to the center of the gas outlet tube 7; and
⅞ inch from the gas-solid inlet 2 to the point 15 of the deflection means 4.

The efficiency of the separator was determined using catalyst solids and air with the opening of the gas outlet located at various positions.

In Position A, the lower edge 22 of the horizontal opening 8 of the gas outlet 7 was located 90° down from the vertical center line 24 of the gas outlet 7 and facing towards the riser reactor. The opening 8 was 1 9/16 inches from the lower edge 22 to the upper edge 20. With a solid loading between 0.2 and 1.4 lbs. of catalyst per cubic foot of air and a riser exit velocity of 20 ft/sec the efficiency of the separator was between 96% and 98%; at 29 ft/sec the efficiency was between 95% and 99%; at 37 ft/sec the efficiency was between 95% and 98% and at 45 ft/sec the efficiency between 97% and 99%.

In Position B, the center of the horizontal opening 8 on the gas outlet 7 was 180° down from the vertical center line 24 of the gas outlet. The horizontal opening 8 was 1 9/16 inches from edge to edge. With a solid loading between 0.245 and 0.275 lbs. of catalyst per cubic foot of air and a riser exit velocity of 37 ft/sec the efficiency of the separator was between 94% and 97%.

In Position C, the lower edge 22 of the horizontal opening 8 of the gas outlet 7 was located 90° down from the vertical center line 24 of the gas outlet 7 and facing away from the riser reactor. The opening 8 was 1 9/16 inches from the lower edge 22 to the upper edge 20. With a solid loading between 0.1 and 0.55 lbs. of catalyst per cubic foot of air and a riser exit velocity of 20 ft/sec the efficiency of the separator was between 92% and 97%; at 29 ft/sec the efficiency of the separator was between 95% and 98%; at 37 ft/sec the efficiency of the separator was between 97% and 100% and at 45 ft/sec the efficiency of the separator was between 95% and 98%.

The most efficient positions of the opening on the gas outlet were Position A and Position C. The examples also indicate that as the solids loading and exit velocity increased the efficiency of the separator increased.

Many variations of the present invention will suggest themselves to those skilled in the art in light of the above-detailed description. All such obvious modifications are within the full intended scope of the claims.

We claim:
1. An apparatus for the separation of a gas-solids mixed phase stream which comprises:
 (a) an upwardly directed gas-solids separator inlet;
 (b) a separator housing;

(c) a means at the top of the separator housing for deflecting the gas-solids mixed phase stream to separate solids from the gas;
(d) a solids outlet from the separator housing;
(e) a horizontally disposed gas outlet means extending through the separator housing parallel to the means for deflecting the gas-solids mixed phase stream having at least one horizontally upwardly disposed opening on the side of the gas outlet means.

2. The apparatus of claim 1 wherein the upwardly directed gas-solids inlet is centrally locate din the separator housing.

3. The apparatus of claim 2 wherein the deflection means is attached to the top surface of the separator housing directly above the centrally located gas-solids inlet and further comprising two semi-circular separating areas in the separator housing.

4. The apparatus of claim 3 wherein said solids outlet comprises a downwardly directed solids outlet extending from each semi-circular separating area.

5. The apparatus of claim 4 wherein the outer wall of the downwardly directed solids outlet is continuous with the outer wall of said semi-cylindrical separator housing.

6. The apparatus of claim 5 wherein the downwardly directed solids outlet extend downwardly and parallel to each other toward a catalyst solid collection bed.

7. The apparatus of claim 5 wherein the downwardly directed solids outlet extend downwardly toward a catalyst solid collection bed and angle toward each other.

8. The apparatus of claim 5 wherein each semi-circular separating area contains a horizontally disposed gas outlet means.

9. The apparatus of claim 8 further comprising a horizontal base in the separator housing and wherein the gas outlet means is parallel to the curved surface of the semi-circular separating area and parallel to the horizontal base.

10. The apparatus of claim 9 wherein the horizontally disposed opening on the gas outlet means is directed inwardly toward the deflection means with the lower edge of the opening at an angle between 30° and 135° to the vertical center line of the gas outlet means and the upper edge of the opening is at an angle between −30° and 75° to the vertical center line of the gas outlet means.

11. The apparatus of claim 10 wherein the lower edge of the opening is at an angle between 30° and 90° to the vertical center line of the gas outlet means and the upper edge of the opening is at an angle between 0° and 30° to the vertical center line of the gas outlet means.

12. The apparatus of claim 11 wherein the lower edge of the opening is at an angle of about 90° to the vertical center line of the gas outlet means and the upper edge of the opening is at an angle of about 30° to the vertical center line of the gas outlet means.

13. The apparatus of claim 9 wherein the horizontally disposed opening in the gas outlet means is directed outwardly away from the deflection means with the lower edge of the opening at an angle between 30° and 135° to the vertical center line of the gas outlet means and the upper edge of the opening is at an angle between −30° and 75° to the vertical center line of the gas outlet means.

14. The apparatus of claim 13 wherein the lower edge of the opening is at an angle between 30° and 90° to the vertical center line of the gas outlet means and the upper edge of the opening is at an angle between 0° and 30° to the vertical center line of the gas outlet means.

15. An apparatus for the separation of a gas-solids mixed phase stream which comprises:
(a) an upwardly directed gas-solids separator inlet;
(b) a separator housing;
(c) a means at the top of the separator housing for deflecting the gas-solids mixed phase stream to separate solids from the gas;
(d) a solids outlet from the separator housing; and
(e) a horizontally disposed gas outlet means extending through the separator housing parallel to the means for deflecting the gas-solids mixed phase stream having at least one horizontally upwardly disposed opening on the side of the gas outlet means that is directed either inwardly toward the deflection means with the lower edge of the opening at an angle between 30° and 135° to the vertical center line of the gas outlet means, or outwardly away from the deflection means with the lower edge of the opening at an angle between 30° and 135° to the vertical center line of the gas outlet means and the upper edge of the opening is at an angle between −30° and 75° to the vertical center line of the gas outlet means.

16. An apparatus for the separation of a gas-solids mixed phase stream which comprises:
(a) a gas-solids separator inlet;
(b) a separator housing;
(c) a means at the top of the separator housing for deflecting the gas-solids mixed phase stream to separate solids from the gas;
(d) a solids outlet from the separator housing; and
(e) a horizontally disposed gas outlet means extending through the separator housing parallel to the means for deflecting the gas-solids mixed phase stream having at least one horizontally upwardly disposed opening on the side of the gas outlet means.

* * * * *